UNITED STATES PATENT OFFICE.

GEORGES MAIRE, OF ALEXANDRIA, EGYPT.

PROCESS FOR PRODUCING A PRODUCT FOR ATTRACTING INSECTS.

1,059,888. Specification of Letters Patent. Patented Apr. 22, 1913.

No Drawing. Application filed August 24, 1911. Serial No. 645,831.

*To all whom it may concern:*

Be it known that I, GEORGES MAIRE, a citizen of the Republic of France, and a resident of 108 Rue du Prince Abdel-Moneim, Alexandria, Egypt, have invented a new and useful Process for Producing a Product for Attracting Insects, of which the following is a specification.

This invention has for its object a process for producing a product emitting odoriferous effluvia capable of attracting certain insects from a great distance to a trap serving to catch them, such for example as the trap which formed the object of patent application Serial No. 584,329 filed on the 28th September, 1910.

In carrying out the process a liquid composed of sweetened juices, syrups and cane sugar syrup residues for example is caused to ferment by means of a ferment in which the direct alcoholic ferments (saccharomycetes) have given place to the secondary ferments (at least for the greater part) in such a manner that at the expense of the primary alcohols secondary alcohols are produced which constitute an attractive factor influencing the insects that it is desired to catch.

In order to manufacture this product the following mixture may be used for example: 3 parts of sugar factory molasses. 1 part of cane sugar syrup of maximum concentration. This mixture gives an indication varying approximately between 36° and 46° Baumé. It is reduced to 20° Baumé by the addition of cold water at a temperature below 25° C. It is then caused to ferment in appropriate tanks and in a place where the temperature does not exceed 25° C. In order to obtain this fermentation, half per cent. by weight or volume of the ferment hereinafter described is added to the mass. At the end of some hours this ferment produces a fermentation in which the higher alcohols develop at the expense of the primary alcohols. The liquor thus prepared is ready for use after the tenth day of fermentation; at this period the fermentation has greatly diminished in the tanks or jars in which the liquor has been decanted; it may remain for several months in this condition of slow (almost latent) fermentation which is resumed and completed when the liquor is exposed to the air for example, when it is spread on the canvas of the traps.

The ferment employed is of the following composition:—10% of beer yeast is added to sugar cane juice, honey or even simple molasses, or to a mixture of these three substances, the whole being brought to a density of 20° as shown by the hydrometer. The mixture is then allowed to ferment for 60 to 70 days in a fresh and airy place. The mixture is stirred several times a day. After this period of fermentation the alcoholic ferments (saccharomycetes) which alone are developed at the beginning are gradually replaced by secondary ferments capable of furnishing the higher alcohols. At this period in its development when it is added to the mixture referred to above the ferment permits of obtaining immediately secondary fermentations to the detriment of the primary fermentations and consequently higher alcohols in place of the primary alcohols.

What I claim and desire to secure by Letters Patent of the United States is:—

The process of producing a substance emitting odoriferous effluvia capable of attracting insects, consisting in preparing a mixture of molasses, cane sugar syrup and water, adding to said mixture a prepared ferment, containing ferments capable of transforming sugar into higher alcohols, and exposing the mixture to the air to cause the mixture to ferment and develop the odoriferous effluvia.

In testimony whereof I have signed my name to this specification, in the presence of two subscribing witnesses.

GEORGES MAIRE.

Witnesses:
F. DU PASQUE,
ELI GRANGER.